(12) United States Patent
Sopcic et al.

(10) Patent No.: US 9,500,136 B2
(45) Date of Patent: Nov. 22, 2016

(54) SYSTEMS AND METHODS FOR GENERATING VARIABLE RAMP RATES FOR TURBOMACHINERY

(71) Applicant: General Electric Company, Schenectady, NY (US)

(72) Inventors: Paige Marie Sopcic, Greenville, SC (US); William Forrester Seely, Taylors, SC (US); Jason Dean Fuller, Simpsonville, SC (US); Daniel Richard Waugh, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 29 days.

(21) Appl. No.: 14/590,513

(22) Filed: Jan. 6, 2015

(65) Prior Publication Data
US 2016/0195026 A1    Jul. 7, 2016

(51) Int. Cl.
G06F 19/00    (2011.01)
F02C 9/28    (2006.01)
F02C 3/04    (2006.01)

(52) U.S. Cl.
CPC .. *F02C 9/28* (2013.01); *F02C 3/04* (2013.01)

(58) Field of Classification Search
CPC ................. F02C 7/26; G05B 23/0235; G01M 15/14; F01D 19/00
USPC ............ 701/54, 63, 100, 107, 113; 340/945, 340/959, 4.32, 539.1
See application file for complete search history.

(56) References Cited

U.S. PATENT DOCUMENTS

| 3,898,439 | A | 8/1975 | Reed et al. |
| 7,600,369 | B2 | 10/2009 | Tanaka et al. |
| 7,761,190 | B2* | 7/2010 | Delmerico ............ F03D 7/0272 290/44 |
| 2009/0069998 | A1* | 3/2009 | Mehrer ..................... F02C 7/26 701/100 |
| 2011/0289934 | A1 | 12/2011 | Desabhatla |
| 2012/0131917 | A1 | 5/2012 | Piccirillo et al. |
| 2014/0145440 | A1* | 5/2014 | Gupta ..................... F03D 7/028 290/44 |
| 2014/0316592 | A1* | 10/2014 | Haj-Maharsi ........ F03D 7/0284 700/287 |

FOREIGN PATENT DOCUMENTS

EP    198502    10/1986

* cited by examiner

*Primary Examiner* — Gertrude Arthur Jeanglaud
(74) *Attorney, Agent, or Firm* — Fletcher Yoder, P.C.

(57) ABSTRACT

A system includes a controller configured to receive one or more inputs associated with an operation of a turbine system, derive a set of ramp rates for the turbine system based at least in part on the one or more inputs, and to select a ramp rate from the set of ramp rates. The ramp rate includes a variable ramp rate. The controller is further configured to generate an output signal based on the selected ramp rate.

20 Claims, 3 Drawing Sheets

SYSTEMS AND METHODS FOR GENERATING VARIABLE RAMP RATES FOR TURBOMACHINERY

BACKGROUND OF THE INVENTION

The subject matter disclosed herein relates to industrial control systems, and more specifically, to variable ramp rate control systems for turbomachinery.

Certain systems, such as an industrial control system, may provide for capabilities that allow the control and analysis of one or more industrial machines such as, turbine systems or generator systems that may be included in an industrial system (e.g., power generation system). For example, the industrial control system may include controllers, field devices, and sensors storing data used in controlling the turbine systems or generator systems. One particular operational parameter of a turbine system that may be of particular interest to control is the loading rate or the ramp rate of the turbine system. However, because the ramp rate of a turbine system may include a fixed value, the efficiency or speed at which the turbine system may reach maximum load may be limited. It would be useful to provide methods to improve ramp rate control of turbine systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller configured to receive one or more inputs associated with an operation of a turbine system, derive a set of ramp rates for the turbine system based at least in part on the one or more inputs, and to select a ramp rate from the set of ramp rates. The ramp rate includes a variable ramp rate. The controller is further configured to generate an output signal based on the selected ramp rate.

In a second embodiment, a non-transitory computer-readable medium having code stored thereon includes instructions to cause a controller to receive one or more inputs associated with an operation of a turbine system, cause the controller to derive a set of ramp rates for the turbine system based at least in part on the one or more inputs, and to cause the controller to select a ramp rate from the set of ramp rates. The ramp rate includes a variable ramp rate. The code includes further instructions to cause the controller to generate an output signal based on the selected ramp rate.

In a third embodiment, a system includes a gas turbine system and a controller communicatively coupled to the gas turbine system. The controller includes a selector device configured to receive a plurality of inputs associated with an operation of the gas turbine system. The plurality of inputs includes a first set of model based operational parameters of the gas turbine system and a second set of sensed operational parameters of the gas turbine system. The selector device is also configured to derive a plurality of ramp rates for the gas turbine system based on the plurality of inputs. The plurality of ramp rates includes a respective maximum tolerable ramp rate for each component of the gas turbine system. The selector device is then configured to select one or more ramp rates of the plurality of ramp rates. The controller also includes a ramp controller device configured to receive the selected one or more ramp rates, and to generate an output signal based on the selected one or more ramp rates.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
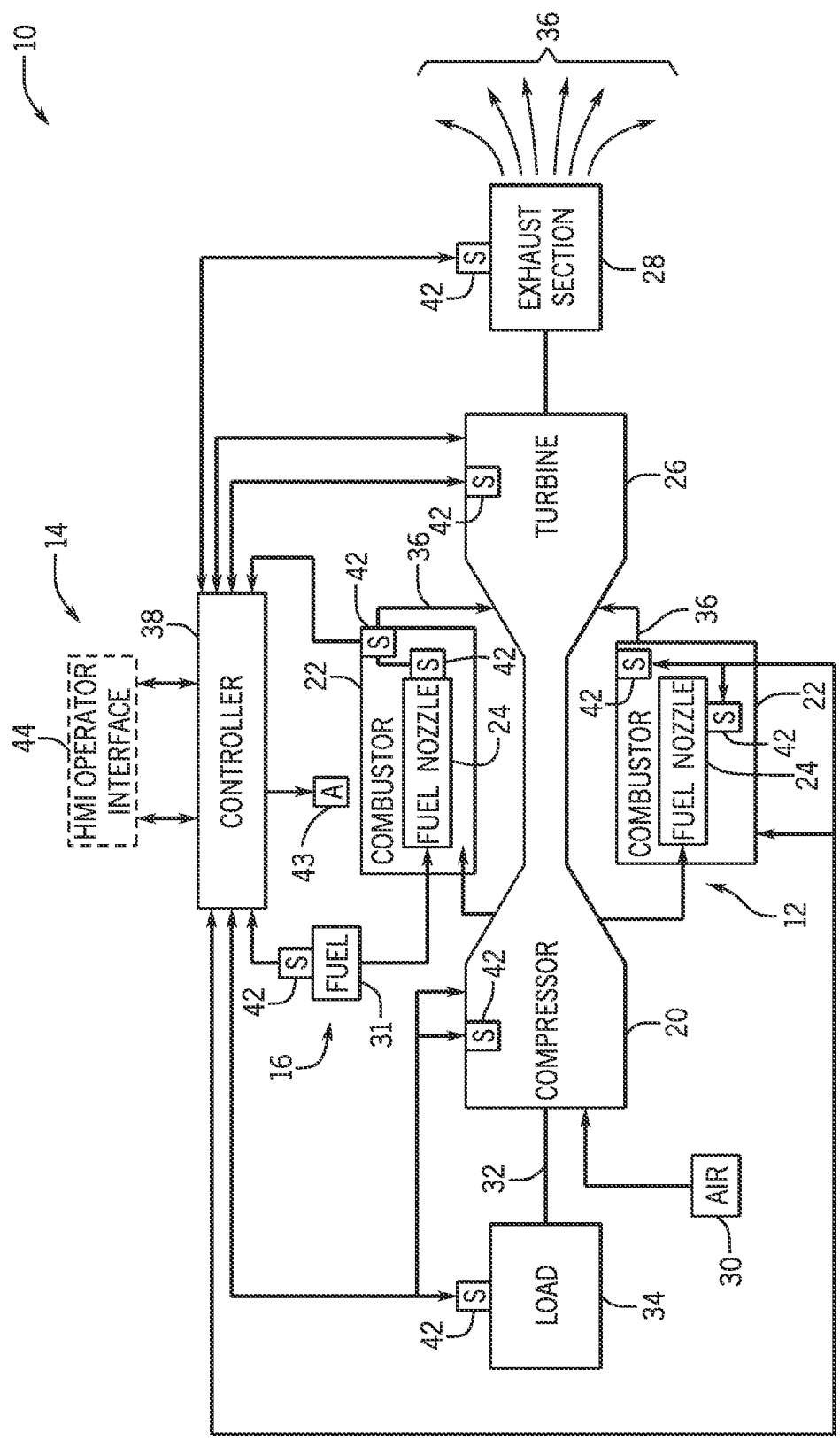
FIG. 1 is a block diagram of an embodiment of an industrial system including one or more industrial machines, in accordance with the present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to a ramp rate control system useful in generating and selecting variable ramp rates for turbomachinery, such as gas turbine systems. Specifically, the ramp rate control system may begin by receiving real-time sensed operating parameters (e.g., real-time sensed speed, temperature, torque, and so forth), modeled or estimated parameters (e.g., prediction models of the speed, temperature, torque, and so forth), and inputs (e.g., user inputs) associated with the operation of the gas turbine system. The ramp rate control system may then dynamically select a ramp rate from a derived set of ramp rates over the loading period of the gas turbine system, in which the selected ramp rate may be based on the lowest of the maximum tolerable ramp rate at each instance in time allowed for each component of the gas turbine system. In this way, the present techniques may allow for fast ramping of the gas turbine system and variable control of the power output of the gas turbine system. Indeed, by using a variety of data inputs based on, for example, sensor measurements, physics-based models, and/or operator judgment, the present techniques may allow the gas turbine system to reach maximum load at a faster rate than would be possible utilizing only a fixed ramp rate. As used herein, "ramp rate" or "load rate" may refer to an amount of load (e.g., electrical power output to an electrical transmission or distribution grid, mechanical power output to an industrial machine, and so forth) that may be placed upon a power generating machine (e.g., gas turbine, steam turbine, generator, and the like) per unit of time. For example, for a gas turbine system, a steam turbine system, or other similar power generation system, the "ramp rate" or "load rate" may be measured in units of megawatts (MW) per unit time (e.g., MW/min). The techniques described herein may be applicable to other turbomachinery, such as heat recovery steam generation (HRSG) systems, steam turbines, compressors, and the like.

With the foregoing in mind, it may be useful to describe an embodiment of an industrial system, such as an example industrial system 10 illustrated in FIG. 1. Indeed, while the present embodiments may be discussed with respect to an illustration of a gas turbine system (e.g., as illustrated in FIG. 1), it should be appreciated that the industrial system 10 may, in some embodiments, include a steam turbine system, a hydraulic turbine system, one or more compressor systems (e.g., aeroderivative compressors, reciprocating compressors, centrifugal compressors, axial compressors, screw compressors, and so forth), one or more electric motor systems, industrial systems including, for example, fans, extruders, blowers, centrifugal pumps, or any of various other industrial machinery that may be included in an industrial plant or other industrial facility. As will be further appreciated, the techniques discussed herein may be used to monitor and control any of the aforementioned industrial machinery, or any combination of the industrial machinery.

As illustrated in FIG. 1, the industrial system 10 may include a gas turbine system 12, a monitoring and control system 14, and a fuel supply system 16. The gas turbine system 12 may include a compressor 20, combustion systems 22, fuel nozzles 24, a turbine 26, and an exhaust section 28. During operation, the gas turbine system 12 may pull air 30 into the compressor 20, which may then compress the air 30 and move the air 30 to the combustion system 22 (e.g., which may include a number of combustors). In the combustion system 22, the fuel nozzle 24 (or a number of fuel nozzles 24) may inject fuel that mixes with the compressed air 30 to create, for example, an air-fuel mixture.

The air-fuel mixture may combust in the combustion system 22 to generate hot combustion gases, which flow downstream into the turbine 26 to drive one or more turbine 26 stages. For example, the combustion gases move through the turbine 26 to drive one or more stages of turbine 26 blades, which may in turn drive rotation of a shaft 32. The shaft 32 may connect to a load 34, such as a generator that uses the torque of the shaft 32 to produce electricity. After passing through the turbine 26, the hot combustion gases may vent as exhaust gases 36 into the environment by way of the exhaust section 28. The exhaust gas 36 may include gases such as carbon dioxide ($CO_2$), carbon monoxide (CO), nitrogen oxides ($NO_x$), and so forth.

In certain embodiments, the system 10 may also include a controller 38, a number of sensors 42, and a human machine interface (HMI) operator interface 44. The controller may also be communicatively coupled to one or more actuators 43 suitable for controlling components of the system 10. The actuators 43 may include valves, switches, positioners, pumps, and the like, suitable for controlling the various components of the system 10. The controller 38 may receive data from the sensors 42, and may be used to control the compressor 20, the combustors 22, the turbine 26, the exhaust section 28, the load 34, and so forth. The controller 38 may output alarm signals, operational information signals, or other notifications to the HMI operator interface 44. The HMI operator interface 44 may be used to receive operator inputs that may be provided to the controller 38. As will be further appreciated, in response to the sensor 42 data and inputs received via the HMI operator interface 44, the controller 38 may also derive one or more model based ramp rates for the turbine 26 to allow the turbine 26 at a higher rate faster than, for example, a nominal or fixed ramp rate of the turbine 26. This may increase the operational efficiency (e.g., fuel efficiency) of the turbine 26, and, by extension, the operational efficiency of the industrial system 10.

In certain embodiments, the HMI operator interface 44 may be executable by one or more computer systems, which may be used by a plant operator to interface with the industrial system 10 via an HMI operator interface 44. Accordingly, the HMI operator interface 44 may include various input and output devices (e.g., mouse, keyboard, monitor, touch screen, or other suitable input and/or output device) such that a plant operator may provide commands (e.g., control and/or operational commands) to the controller 38, and to receive operational information from the controller 38, or directly from the sensors 42. Similarly, the controller 38 may be responsible for controlling one or more final control elements coupled to the components (e.g., the compressor 20, the turbine 26, the combustors 22, the load 34, and so forth) of the industrial system 10 such as, for example, one or more actuators, valves, transducers, and so forth.

In certain embodiments, the sensors 42 may be any of various sensors useful in providing various operational data to the controller 38 including, for example, pressure and temperature of the compressor 20, speed and temperature of the turbine 26, vibration of the compressor 20 and the turbine 26, $CO_2$ levels in the exhaust gas 36, carbon content in the fuel 31, temperature of the fuel 31, temperature, pressure, clearance of the compressor 20 and the turbine 26 (e.g., distance between the compressor 20 and the turbine 26 and/or between other stationary and/or rotating components that may be included within the industrial system 10), flame temperature or intensity, vibration, combustion dynamics (e.g., fluctuations in pressure, flame intensity, and so forth), load data from load 34, and so forth. In some embodiments, the controller 38 may use the data received from the sensors 42 to generate one or more ramp rate models and/or ramp rate settings to actively control the ramp rate and/or load rate of the gas turbine system 12. For example, in one embodiment, the controller 38 may be programmably retrofitted with instructions to generate one or more ramp rate models and/or ramp rate settings for the gas turbine system 12. The controller 82 may then apply the ramp rate to control the system 10 and components thereof, for example, by generating an output signal based on the selected ramp rate. The output signal may be communicated to the one or more actuators 43 to adjust fuel flow, oxidant flow (e.g., air 30), change inlet guide vane angles, and the like.

Figure 2:
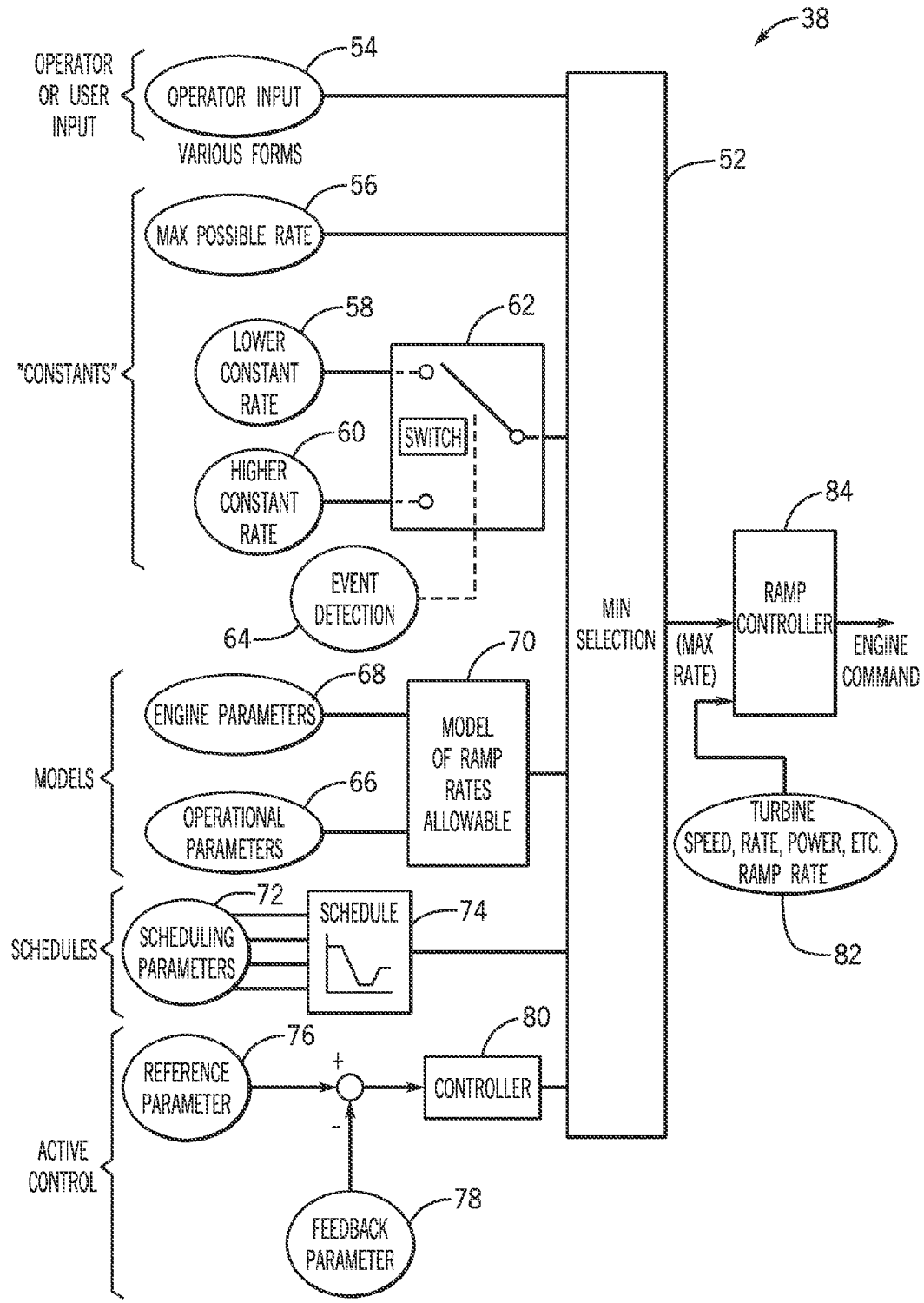
FIG. 2 is a diagram of an embodiment of the system of FIG. 1, including a variable ramp rate controller, in accordance with the present embodiments.

In certain embodiments, to allow the gas turbine system 12 to be ramped at a higher rate (e.g., at an adjustable or variable ramp rate as opposed to a fixed ramp rate) than, for example, a nominal or fixed ramp rate of the gas turbine system 12, the controller 38 may derive one or more ramp rate based models to derive ramp parameters for the gas turbine system 12. For example, as illustrated in FIG. 2, the controller 38 may include a selector 52. The selector 52 may include a multiplexer (MUX) or other selection device that may be used to receive various inputs (e.g., measurements from the sensors 42, model based control [MBC] models of operational parameters of the gas turbine system 12, operator or user inputs, and so forth) relating to the operation of the gas turbine system 12, and to select a ramp rate (e.g., variable ramp rate) for the gas turbine system 12 based thereon.

For example, in certain embodiments, as further depicted in FIG. 2, the selector 52 may receive an operator input 54. The operator input 54 may include data input by personnel (e.g., engineers, field technicians, operators, and so forth) via the HMI operator interface 44. For example, an operator may input data to the selector 52 that may be based on, for example, human observation of the compressor 20, the combustors 22, the turbine 26 and/or other components that may be included as part of the gas turbine system 12. Similarly, the selector 52 may receive a number of constant inputs such as, for example, maximum possible ramp rate input 56, and lower and upper constant ramp rate inputs 58 and 60. Specifically, the maximum possible ramp rate input 56 may represent the maximum operating ramp rate (e.g., determined based on the engineering specification) for the particular turbine 26, several other turbines 26 that may be included within the industrial system 10, or, in other embodiments, the maximum operating ramp rate for each component of the gas turbine system 12.

Similarly, the lower constant ramp rate input 58 may represent a lower limit (e.g., a user-configurable value) for the ramp rate of the gas turbine system 12, while the upper constant ramp rate input 60 may represent an upper limit (e.g., a user-configurable value that may be lower than the value of the maximum possible ramp rate input 56) for the ramp rate of the gas turbine system 12. As further illustrated, a switch block 62 may be provided to toggle between the lower constant ramp rate input 58 and the upper constant ramp rate input 60 based on, for example, an event detection parameter input 64. In certain embodiments, the switch block 62 may include additional logic such as, for example, hysteresis, deadbands, slew times, and so forth, which may allow for more appropriate transient operation when switching between ramp rates. The event detection parameter input 64 may include, for example, an input indicating electrical fault conditions, overvoltage conditions, overspeed and/or overloading conditions with respect to the compressor 20 and the turbine 26, lean blowout (LBO) conditions with respect to the combustors 22, mode transfer (e.g., lean-lean mode transfer, premixing mode transfer) by the combustors 22, or any of various operational events that may be detected by the controller 38.

In certain embodiments, as further illustrated, the selector 52 may also receive model based gas turbine system 12 operational parameters input 66 and model based gas turbine 26 operational parameters input 68 (e.g., predictive models of the speed, torque, temperature, pressure, vibration, and so forth). In some embodiments, the controller 38 may derive the model based operational parameters input 66 and model based turbine 26 operational parameters input 68 based on one or more physics-based models to derive, for example, one or more real-time operational boundary models (e.g., differential equation model having boundary conditions based on system 10 constraints such as temperature, pressure, fluid flow, mass flow, fuel type, oxidant type, and the like) estimating all contributions to the power output of the gas turbine system 12 and/or other components (e.g., compressor 20, the combustors 22, the turbine 26) that may be included as part of the gas turbine system 12. The controller 38 may then used the model based operational parameters input 66 and gas turbine system 12 model based operational parameters input 68 to derive one or more ramp rate models 70 of tolerable or allowable ramp rates for the gas turbine system 12 and/or each individual component of the gas turbine system 12. For example, the ramp rate models 70 may include physics-based models such as, for example, low cycle fatigue (LCF) life prediction models, computational fluid dynamics (CFD) models, finite element analysis (FEA) models, solid models (e.g., parametric and non-parametric modeling), 3-dimension (3-D) to 2-dimension (2-D) FEA mapping models, or other physics-based models that may be used to model the tolerable or allowable ramp rates of the gas turbine system 12 and/or other components of the industrial system 10.

As further depicted, the selector 52 may also receive scheduling parameters 72, which may be provided to a ramp rate scheduling block 74 (e.g., computational block). The scheduling parameters 72 may be utilized by the ramp rate scheduling block 74 to identify one or more operational schedules of the gas turbine system 12 that may include, for example, potential areas of, and/or within, the gas turbine system 12 that may be limited by a higher or variable ramp rate. Specifically, the ramp rate scheduling block 74 may derive and schedule a variable ramp rate (e.g., as compared to a fixed ramp rate) for the gas turbine system 12, and, by extension, may control the power output of the gas turbine system 12. Indeed, the ramp rate scheduling block 74 may generate a variable ramp rate that may include slowing the increase in power output of the gas turbine system 12 based on, for example, the minimum operational parameters (e.g., speed, torque, temperature, pressure, vibration, and so forth) that is tolerable or allowable by each component (e.g., compressor 20, the combustors 22, the turbine 26, and the like) of the gas turbine system 12 at each instance in time. Thus, the variable ramp rate generated by the ramp rate scheduling block 74 may allow the gas turbine system 12 to reach maximum load (e.g., approximately 80%-100% load) at a rate faster than may be possible utilizing a fixed ramp rate.

As further illustrated, the selector 52 may also receive a reference parameter input 76 that may be subtracted by a feedback parameter input 78 to produce an error signal. The error signal may be then provided to a controller 80 (e.g., microcontroller), and then passed to the selector 52. Specifically, the reference parameter input 76 and the feedback parameter input 78 may be used to perform real-time control (e.g., tuning) of the turbine 26 and/or other components that may be included as part of the gas turbine system 12. For example, the reference parameter input 76 and the feedback parameter input 78 may include, but are not limited to, measurements, predictions, estimations, models, schedules, and so forth.

In certain embodiments, based on the various inputs (e.g., operator input 54, maximum possible ramp rate input 56, event detection parameter input 64, industrial mode based operational parameters input 66, gas turbine system 12 model based operational parameters input 68, scheduling parameters 72, and so forth), the selector 52 may select (e.g., dynamically and variably) an appropriate ramp rate for the gas turbine system 12 that may vary over one or more periods of time based on, for example, the lowest of the maximum ramp rates physically allowable or tolerable (e.g., determined based on the engineering specifications) by the compressor 20, the combustors 22, the turbine 26 and/or other components that may be included as part of the gas turbine system 12. The selector 52 may then provide the selected maximum ramp rate to a ramp controller 84, which may also receive the current sensed real-time gas turbine system 12 operational parameters input 82 (e.g., speed, temperature, torque, pressure, vibration, nominal ramp rate, and so forth) as a direct input.

Based on the selected maximum ramp rate and the real-time gas turbine system 12 operational parameters input 82, the ramp controller 84 may then generate a fuel flow command value, which may be then output to one or more control effectors (e.g., actuators 43, and the like) that may be coupled to the gas turbine system 12 to adjust the fuel flow to the gas turbine system 12, and, by extension, actively and variably control the ramp rate and the power output of the gas turbine system 12. In this way, the present techniques may allow for fast ramping of the gas turbine system and variable control of the power output of the gas turbine system. Indeed, by using a variety of data inputs based on, for example, sensor measurements, physics-based models, and/or operator or engineering judgment, the present techniques may allow the gas turbine system to reach maximum load at a faster rate than may be possible utilizing only a fixed ramp rate.

As an example of the presently disclosed techniques, in one or more embodiments, the combustors 22 may require that the ramp rate be limited for several seconds (e.g., approximately 0.1 seconds to 5 seconds) after, for example, a combustion mode transfer (e.g., lean-lean mode transfer, premixing mode transfer). The controller 38 may provide a fuel flow command and/or ramp rate command to initiate acceleration of the turbine 26. It then follows that when the controller 38 may identify that a combustion mode transfer has been requested, the selector 52 may select the maximum ramp rate that is appropriate (e.g., allowable or tolerable) for these operational conditions to provide to the ramp rate controller 84. The controller 38 may then hold a lower ramp rate until the controller 38 detects that the combustion mode transfer has been completed, and that the turbine 26 and/or other components of the gas turbine system 12 have stabilized enough to allow for higher (e.g., faster) ramp rates. When the controller 38 detects that the aforementioned condition have been satisfied, the selector 52 may select a higher maximum ramp rate to provide to the ramp rate controller 84, and may thus allow higher ramp rates to be achieved by the turbine 26 and/or the other components of the gas turbine system 12. Thus, as previously noted, the present techniques may allow for fast ramping of the gas turbine system 12 and variable control of the power output of the gas turbine system 12 that may otherwise be unavailable utilizing only fixed ramp rates.

Figure 3:
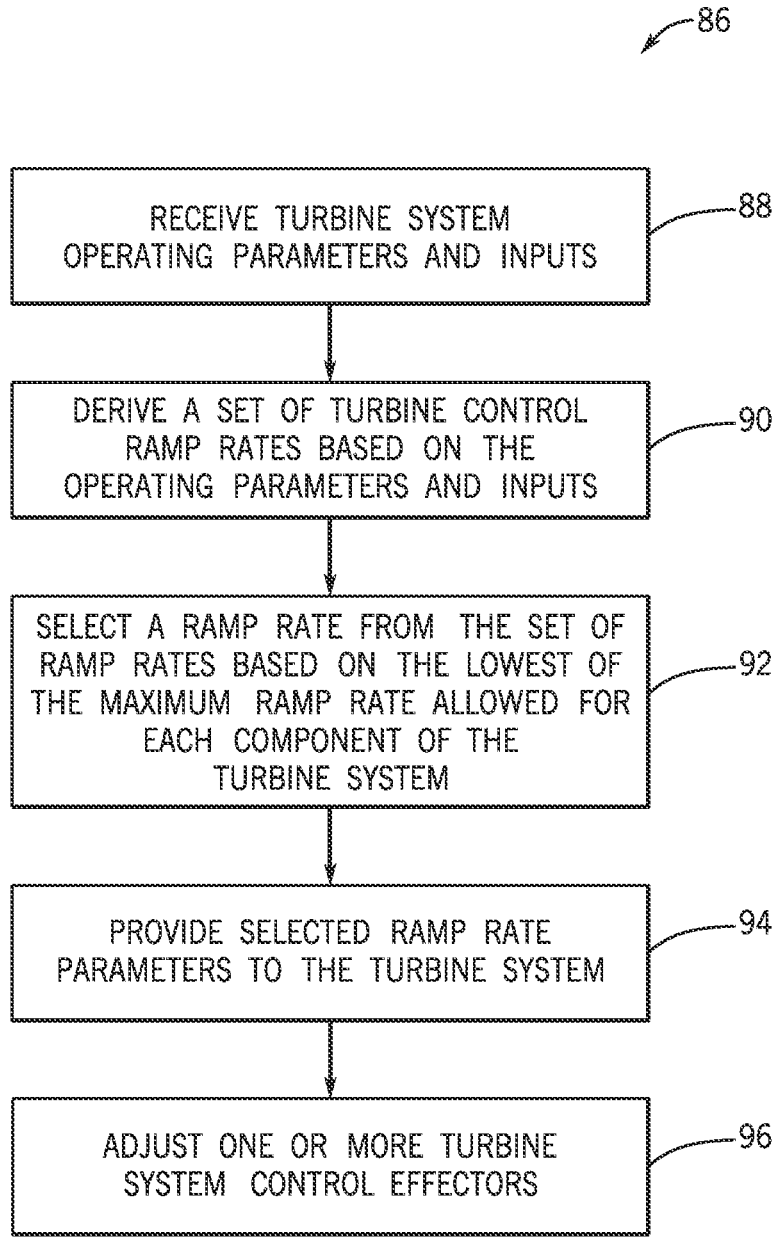
FIG. 3 is a flowchart illustrating an embodiment of a process useful in generating and selecting variable ramp rates for the one or more industrial machines of FIG. 1, in accordance with the present embodiments.

Turning now to FIG. 3, a flow diagram is presented, illustrating an embodiment of a process 86 useful in generating and selecting variable ramp rates for a gas turbine system during loading, by using, for example, the controller 38 included in the industrial system 10 depicted in FIG. 1. The process 86 may include code or instructions stored in a non-transitory machine-readable medium (e.g., a memory) and executed, for example, by one or more processors included in the controller 38. The process 86 may begin with the controller 38 receiving (block 88) the turbine system operating parameters and inputs. For example, as previously discussed, the controller 38 may receive sensed operating parameters of the gas turbine system 12 and various inputs including, for example, an operator input 54, a maximum possible ramp rate input 56, an event detection parameter input 64, model based operational parameters input 66, gas turbine system 12 model based operational parameters input 68, scheduling parameters 72, and so forth.

The process 86 may then continue with the controller 38 deriving (block 90) a set of turbine control ramp rates based on the gas turbine system 12 operating parameters and the received inputs. For example, as previously discussed, the controller 38 may derive one or more model based ramp rates for the gas turbine system 12 to allow the gas turbine system 12 to load at a rate faster than, for example, a nominal or fixed ramp rate of the gas turbine system 12. The process 86 may then continue with the controller 38 selecting (block 92) a ramp rate from the derived set of ramp rates based on the lowest of the maximum ramp rates allowed for each component of the turbine system. For example, the selector 52 of the controller 38 may select an appropriate ramp rate for the gas turbine system 12 at each instance in time during loading based on, for example, the lowest of the maximum ramp rates physically tolerable or allowable (e.g., determined based on the engineering specifications) by the compressor 20, the combustors 22, the turbine 26 and/or other components that may be included as part of the gas turbine system 12.

The process 86 may then continue with the controller 38 providing (block 94) the selected ramp rate parameters to the turbine system. For example, based on the selected maximum ramp rate and the real-time gas sensed turbine system 12 operational parameters input 82, the ramp controller 84 of the controller 38 may then generate a fuel flow command value. The process 86 may then conclude with the controller 38 providing the fuel flow command value command to adjust (block 96) one or more control effectors (e.g., actuators 43, and the like) that may be coupled to the gas turbine system 12 to adjust the fuel flow to the gas turbine system 12, and, by extension, may actively and variably control the ramp rate and the power output of the gas turbine system 12. Other generated signals (block 96) may adjust oxidant (e.g., air 43) flow, inlet guide vane angles, and the like.

Technical effects of the present embodiments relate to a ramp rate control system useful in generating and selecting variable ramp rates for gas turbine systems. Specifically, the ramp rate control system may begin by receiving real-time sensed operating parameters (e.g., real-time sensed speed, temperature, torque, and so forth), model based control (MBC) parameters (e.g., prediction models of the speed, temperature, torque, and so forth), and inputs (e.g., user inputs) associated with the operation of the gas turbine system. The ramp rate control system may then dynamically select a ramp rate from a derived set of ramp rates over the loading period of the gas turbine system, which the selected ramp rate may be based on the lowest of the maximum tolerable ramp rate allowed for each component of the gas turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a controller configured to:
   receive one or more inputs associated with an operation of a gas turbine system;

derive a set of ramp rates for the gas turbine system based at least in part on the one or more inputs;

select a ramp rate from the set of ramp rates, wherein the ramp rate comprises a variable ramp rate configured to vary over a loading period of the gas turbine system, and wherein the loading period of the gas turbine system comprises a first time instance and a second time instance in which the variable ramp rate varies therebetween; and generate an output signal based on the selected ramp rate.

2. The system of claim 1, wherein the controller is configured to receive a user input, a maximum possible ramp rate input, a physics-based model input of the operating parameters of the gas turbine system, an event detection input, a measured operational parameter input, a scheduling parameter input, or any combination thereof, as the one or more inputs.

3. The system of claim 1, wherein the controller is configured to:

receive a first physics-based model input of an operating parameter of the gas turbine system and a second physics-based model input of operating parameters of an industrial system comprising the gas turbine system; and derive the set of ramp rates for the gas turbine system by generating a model based control (MBC) model of each a plurality of tolerable ramp rates for the gas turbine system.

4. The system of claim 1, wherein the controller is configured to derive the set of ramp rates for the gas turbine system based on a ramp rate tolerability of each component of the gas turbine system.

5. The system of claim 1, wherein the controller is configured to select varying ramp rates from the set of ramp rates over an operational period of the gas turbine system.

6. The system of claim 5, wherein the controller is configured to select the varying ramp rates from the set of ramp rates over the loading or over a ramping period of the gas turbine system.

7. The system of claim 1, wherein the controller is configured to derive a set of respective maximum ramp rates for each component of the gas turbine system as the set of ramp rates.

8. The system of claim 7, wherein the controller is configured to select a lowest ramp rate from the set of respective maximum ramp rates for each component of the gas turbine system as the selected ramp rate.

9. The system of claim 1, wherein the gas turbine system comprises a generator, a compressor, or a combination thereof.

10. The system of claim 1, wherein the controller is configured to be programmably retrofitted with instructions to:

derive the set of ramp rates for the gas turbine system based on the one or more inputs; and select the ramp rate from the set of ramp rates.

11. A non-transitory computer-readable medium having computer executable code stored thereon, the code comprising instructions to:

cause a controller to receive one or more inputs associated with an operation of a gas turbine system;

cause the controller to derive a set of ramp rates for the gas turbine system based at least in part on the one or more inputs;

cause the controller to select a ramp rate from the set of ramp rates, wherein the ramp rate comprises a variable ramp rate configured to vary over a loading period of the gas turbine system, and wherein the loading period of the gas turbine system comprises a first time instance and a second time instance in which the variable ramp rate varies therebetween; and cause the controller to generate an output signal based on the selected ramp rate.

12. The non-transitory computer-readable medium of claim 11, wherein the code comprises instructions to cause the controller to receive a user input, a maximum possible ramp rate input, a physics-based model input of the operating parameters of the gas turbine system, an event detection input, a measured operational parameter input, a scheduling parameter input, or any combination thereof, as the one or more inputs.

13. The non-transitory computer-readable medium of claim 11, wherein the code comprises instructions to:

cause the controller to receive a physics-based model input of an operating parameter of the gas turbine system and a physics-based model input of operating parameters of an industrial system comprising the gas turbine system; and cause the controller to derive the set of ramp rates for the gas turbine system by generating a model based control (MBC) model of each a plurality of tolerable ramp rates for the gas turbine system.

14. The non-transitory computer-readable medium of claim 11, wherein the code comprises instructions to cause the controller to derive the set of ramp rates for the gas turbine system based on a ramp rate tolerable by each component of the gas turbine system.

15. The non-transitory computer-readable medium of claim 11, wherein the code comprises instructions to cause the controller to select varying ramp rates from the set of ramp rates over an operational period of the gas turbine system.

16. The non-transitory computer-readable medium of claim 15, wherein the code comprises instructions to cause the controller to select the varying ramp rates from the set of ramp rates over a loading or a ramping period of the gas turbine system.

17. The non-transitory computer-readable medium of claim 11, wherein the code comprises instructions to cause the controller to derive a set of respective maximum ramp rates for each component of the gas turbine system as the set of ramp rates.

18. The non-transitory computer-readable medium of claim 17, wherein the code comprises instructions to cause the controller to elect a lowest ramp rate from the set of respective maximum ramp rates for each component of the gas turbine system as the selected ramp rate.

19. A system, comprising:

a gas turbine system; and a controller communicatively coupled to the gas turbine system, comprising:

a selector device configured to:

receive a plurality of inputs associated with an operation of the gas turbine system, wherein the plurality of inputs comprises a first set of model based operational parameters of the gas turbine system and a second set of sensed operational parameters of the gas turbine system;

derive a plurality of ramp rates for the gas turbine system based on the plurality of inputs, wherein the plurality of ramp rates comprises a first maximum tolerable ramp rate for a first component of the gas turbine system and a second maximum tolerable ramp rate for a second component of the gas turbine system; and select one or more ramp rates of the plurality of ramp rates over a loading period of the gas turbine system, wherein the selected one or more ramp rates comprises a selection of the lower of the first maximum tolerable ramp rate and the second maximum tolerable rate; and a ramp controller device configured to receive the selected one or more ramp rates and to generate an output signal based on the selected one or more ramp rates.

20. The system of claim 19, wherein the ramp controller device is configured generate a fuel flow command as the output signal, and wherein the fuel flow command is configured to activate an actuator to control a loading of the gas turbine system.

\* \* \* \* \*